(12) United States Patent
Kussmaul et al.

(10) Patent No.: US 11,249,996 B2
(45) Date of Patent: Feb. 15, 2022

(54) QUERY ADAPTATION FOR A SEARCH SERVICE IN A CONTENT MANAGEMENT SYSTEM

(71) Applicant: International Business Machines Corporation, Armonk, NY (US)

(72) Inventors: Timo Kussmaul, Boeblingen (DE); Uwe Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 16/733,366

(22) Filed: Jan. 3, 2020

(65) Prior Publication Data
US 2021/0209106 A1 Jul. 8, 2021

(51) Int. Cl.
*G06F 17/00* (2019.01)
*G06F 16/2453* (2019.01)
*G06N 20/00* (2019.01)

(52) U.S. Cl.
CPC ....... *G06F 16/24539* (2019.01); *G06N 20/00* (2019.01)

(58) Field of Classification Search
CPC ......... G06F 16/24539; G06F 16/24575; G06F 16/2425; G06N 20/00
See application file for complete search history.

(56) References Cited

U.S. PATENT DOCUMENTS

| | | | | |
|---|---|---|---|---|
| 6,061,676 A | * | 5/2000 | Srivastava | ........ G06F 16/24537 707/694 |
| 8,583,808 B1 | | 11/2013 | Nevill-Manning et al. | |
| 8,660,976 B2 | * | 2/2014 | Vasquez Lopez | .... G06F 40/166 706/48 |
| 8,768,959 B1 | * | 7/2014 | Annapragada | ........ G06F 16/284 707/770 |
| 9,767,182 B1 | | 9/2017 | Thakur et al. | |
| 10,296,658 B2 | | 5/2019 | Le Biannic et al. | |
| 11,188,512 B2 | * | 11/2021 | Kussmaul | ........... G06F 16/2272 |

(Continued)

OTHER PUBLICATIONS

M. Chevalier and G. Hubert, "Query assistant based on experience capitalization for information retrieval systems," 2009 2nd Conference on Human System Interactions, 2009, pp. 502-509, doi: 10.1109/HSI.2009.5091030, May (Year: 2009).*

(Continued)

*Primary Examiner* — Greta L Robinson
(74) *Attorney, Agent, or Firm* — Edell, Shapiro & Finnan, LLC

(57) ABSTRACT

A computer system adapts queries in a content management system. A search query is received from a client application. A rule query based on a search query is executed to identify one or more search rules indicating modifications for the search query, wherein each search rule of the one or more search rules is generated by analyzing a starter search query and a target search query of one or more prior query sequences, and content items associated with the target search query of the one or more prior query sequences. The search query is modified by applying the one or more search rules to the search query. The modified search query is executed to select content items. Embodiments of the present invention further include a method and program product for adapting queries in a content management system in substantially the same manner described above.

20 Claims, 4 Drawing Sheets

(56) References Cited

U.S. PATENT DOCUMENTS

| | | |
|---|---|---|
| 2010/0114864 A1* | 5/2010 | Agam ................... G06F 16/951 |
| | | 707/709 |
| 2012/0173581 A1 | 7/2012 | Hartig et al. |
| 2013/0159318 A1 | 6/2013 | Xu et al. |
| 2014/0025701 A1 | 1/2014 | Zhu et al. |
| 2014/0115444 A1* | 4/2014 | Vasquez Lopez .... G06F 40/166 |
| | | 715/234 |
| 2015/0161276 A1 | 6/2015 | Upstill et al. |
| 2015/0278305 A1 | 10/2015 | Beilmann et al. |
| 2016/0140228 A1* | 5/2016 | Cohen ................... G06F 16/951 |
| | | 707/708 |
| 2016/0371288 A1 | 12/2016 | Le Biannic et al. |
| 2017/0364518 A1 | 12/2017 | Harris et al. |
| 2018/0300982 A1* | 10/2018 | Jarnagin ............. G06F 16/9566 |
| 2018/0373799 A1 | 12/2018 | Koren et al. |
| 2021/0209086 A1 | 7/2021 | Kussmaul et al. |
| 2021/0209105 A1 | 7/2021 | Kussmaul et al. |

OTHER PUBLICATIONS

List of IBM Patents or Patent Applications Treated as Related, Jul. 2021, 1 page.

\* cited by examiner

QUERY ADAPTATION FOR A SEARCH SERVICE IN A CONTENT MANAGEMENT SYSTEM

BACKGROUND

1. Technical Field

Present invention embodiments relate to search services for content management systems, and more specifically, to adapting queries for a search service in a content management system to improve the quality of search results.

2. Discussion of the Related Art

In a content management system, users may collaborate to manage and create digital content items, such as text documents, web pages, images, videos, code scripts, and the like. Content management systems are often based on separate content authoring and content delivery systems, with content authoring including the creation and modification of content, and content delivery referring to the process of providing content to users. A content management system may include a search service that enables content authors to search for content items and enables end users to find content when browsing a website or search-based application. Therefore, the quality of a search service is an important aspect of the user experience of end users and administrators alike.

SUMMARY

According to one embodiment of the present invention, a computer system adapts queries in a content management system. A rule query based on a search query is executed to identify one or more search rules indicating modifications for the search query, wherein each search rule of the one or more search rules is generated by analyzing a starter search query and a target search query of one or more prior query sequences, and content items associated with the target search query of the one or more prior query sequences. The search query is modified by applying the one or more search rules to the search query. The modified search query is executed to select content items. Embodiments of the present invention further include a method and program product for adapting queries in a content management system in substantially the same manner described above.

BRIEF DESCRIPTION OF THE DRAWINGS

Generally, like reference numerals in the various figures are utilized to designate like components.

DETAILED DESCRIPTION

Figure 1:
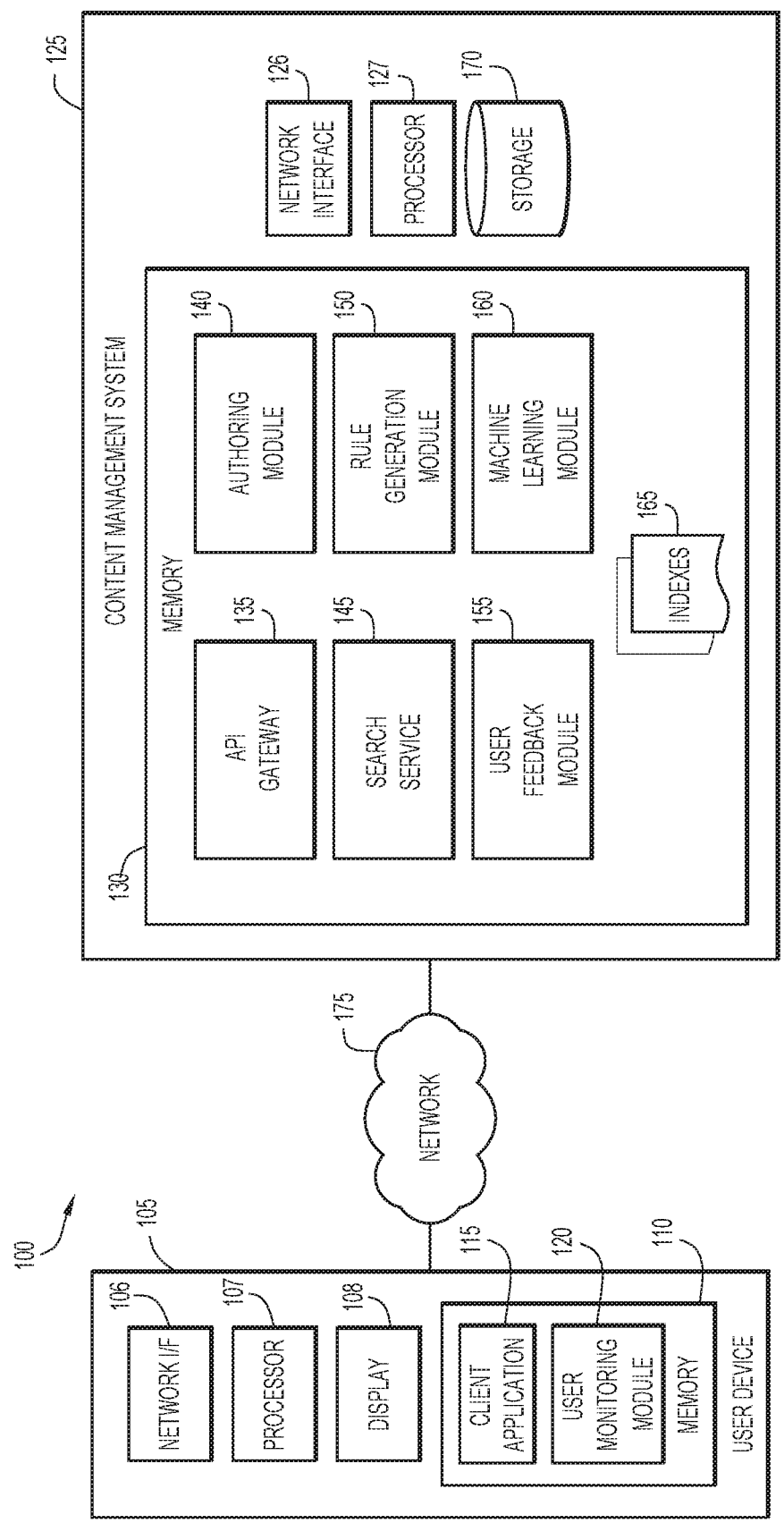
FIG. 1 is a block diagram depicting a computing environment for search query adaptation in accordance with an embodiment of the present invention.

Present invention embodiments relate to search services for content management systems, and more specifically, to adapting queries for a search service in a content management system to improve the quality of search results. A content management system may include any form of content, such as text, media, web pages, and the like. Content may be created and edited using an authoring component of the content management system, and content may be published to end users by a content delivery component. In order to provide these capabilities, content management systems are often implemented as a set of interacting services that are made accessible to external applications via an application programming interface (API) gateway. One of the services included in content management systems is a search service, which processes received queries to identify relevant content for users.

Present invention embodiments automatically adapt received search queries in order to improve relevancy of search results (e.g., content) provided by a search service and presented to a user. A query may be adapted by selecting a rule to apply to the query, which results in a modification to the query. For example, a boosting keyword can be added to a query, causing the search service to return results that might otherwise not have been selected or ranked as highly (e.g., based on the user's original query). Query adaptation involves a two-phase process: first, a received search query is processed to select one or more rules to be applied to the query; applying the one or more rules to the query produces a modified query, which is then processed by a search service to identify content. A search rule is selected in the first phase based on one or more factors, including keywords in the search query and other contextual information. Contextual information may include the identity of the user providing the search query, and the user's view in an application when the search query is made.

In particular, present invention embodiments analyze user interactions during previous client application sessions to identify, based on the sequence of a user's queries and the user's interaction with the results of the queries, relevant content items. Search rules may then be generated by extracting keywords from these relevant content items. For example, when a user searches for content, the user may begin with an initial search query that returns undesired or irrelevant results. The user may then provide subsequent search queries in an effort to refine the user's search until the user eventually provides a search query that successfully returns relevant content. By analyzing the user's query sequence along with the user's interactions with the results of each query, present embodiments can anticipate the results that are relevant to a given query before the user refines his or her search accordingly to return such results.

Thus, search rules can be applied in a manner that adapts a user's search query in order to return content that might not be returned based on the user's unmodified query, but is nevertheless relevant. Accordingly, present invention embodiments improve search query processing by adapting search queries in a manner that shortens a sequence of search queries, enabling a user to avoid a time-consuming search process. Search query sequences can be drastically shortened, as the number of queries that a user provides during the course of searching for content can be reduced to a single query. Moreover, the context of a search query can be considered in addition to a query's keywords, enabling a high degree of precision in selecting the rules that are applied to the query. By adapting search queries according to the embodiments presented herein, a search service can be optimized, resulting in an improved user experience (e.g., a user can find relevant content more quickly) as well as a reduction in the amount of computational resources that are consumed (e.g., by avoiding the processing of search queries that would return irrelevant content).

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for search query adaptation in accordance with an embodiment of the present invention. As depicted, computing environment 100 includes user device 105, a content management system 125, and a network 175. It is to be understood that the functional division among components of computing environment 100 have been chosen for purposes of explaining present invention embodiments and is not to be construed as a limiting example.

User device 105 includes a network interface (I/F) 106, at least one processor 107, a display 108, and memory 110. Memory 110 may include a client application 115 and a user monitoring module 120. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of user device 105 to send and receive data over a network, such as network 175. In some embodiments, a user of user device 105 can access content management system 125 in order to create, edit, and view content. Additionally or alternatively, a user of user device 105 can access content management system 125 to manually define search rules for query adaptation. User device 105 may include internal and external hardware components, as depicted and described in further detail with respect to FIG. 4.

Display 108 may include any electronic device capable of presenting information in a visual form. For example, display 108 may be a liquid crystal display (LCD), a cathode ray tube (CRT) display, a light-emitting diode (LED) display, an electronic ink display, and the like. Information relating to a content management system may be displayed to a user of user device 105 via display 108, including queries, retrieved content, search rules for adapting queries, views of search-based applications, and the like.

Client application 115 and user monitoring module 120 may include one or more modules or units to perform various functions of present invention embodiments described below. Client application 115 and user monitoring module 120 may be implemented by any combination of any quantity of software and/or hardware modules or units, and may reside within memory 110 of user device 105 for execution by a processor, such as processor 107.

Client application 115 may include any application for creating, editing, browsing, and/or accessing content associated with content management system 125, which can include any text, media, web pages, and the like. Client application 115 may include a web browser or other software client for accessing and displaying content. Client application 115 enables a user to provide search queries and to interact with results of search queries.

In some embodiments, client application 115 is a search-based application that utilizes a search service for information access and reporting. During runtime, a search-based application may utilize a search service of a content management system to identify and retrieve content, navigation information, site and page structure, header and footer information, and the like, to support functionality of the application. Client application 115 may send a series of search queries to a search service to retrieve information that is required for rendering the application's current view. Thus, a search-based application may not require a dedicated database, file system, or other persistent components in order to manage information. Client application 115 may present a user interface, via display 108, that includes components for rendering information, such as page headers and footers, navigation structures (e.g., pages of returned search results, scroll bars, etc.), for rendering a page. Thus, the layout of a view of client application 115 can be separated from the content and the navigation structure.

Content authors may use content management system 125 to create and/or edit content that is relevant for a search-based application, such as site and page structure, navigation structure, as well as media such as images, videos, and the like. Content authors may create new pages, author new content, and define new content types and page types. A modified site can be reviewed, approved, and published through content management system 125, which may index the data so that client application 115 may access the data via a search service, such as search service 145.

User monitoring module 120 may monitor a user of user device 105 in order to collect any information relating to a user's usage of user device 105, including user interactions with client application 115. In some embodiments, user monitoring module 120 is an extension or plug-in for client application 115. As a user interacts with client application 115 during one or more client application sessions, user monitoring module 120 may collect information such as a user's provided search queries and the user's interaction with returned search results, including dwell time on search results, user selections of search results, and user navigation through search results. For example, user monitoring module 120 may record how long a user views a particular view of client application 115, such as a page, window, or menu, and any user clicks or other selections by which the user interacts with, or navigates through, content. A user may interact with a content item by, e.g., selecting the content item to reveal more information, copying text associated with the content item, sharing the content item with another user, and the like.

Content management system 125 may include a network interface 126, at least one processor 127, memory 130, and storage 170. Memory 130 may include an API gateway 135, an authoring module 140, a search service 145, a rule generation module 150, a user feedback module 155, a machine learning module 160, and one or more indexes 165. In various embodiments of the present invention, content management system 125 may include a laptop computer, a tablet computer, a netbook computer, a personal computer (PC), a desktop computer, a personal digital assistant (PDA), a smart phone, or any programmable electronic device capable of executing computer readable program instructions. Network interface 126 enables components of content management system 125 to send and receive data over a network, such as network 175. In general, content management system 125 and its modules may serve content to client applications, such as client application 115, by processing and adapting search queries in accordance with presented embodiments. Additionally, content management system 125 and its modules may provide for the manual and/or automatic generation of search rules for adapting search queries. Content management system 125 may include internal and external hardware components, as depicted and described in further detail with respect to FIG. 4.

API gateway 135, authoring module 140, search service 145, rule generation module 150, user feedback module 155, and machine learning module 160 may include one or more modules or units to perform various functions of present invention embodiments described below. API gateway 135, authoring module 140, search service 145, rule generation module 150, user feedback module 155, and machine learning module 160 may be implemented by any combination of any quantity of software and/or hardware modules or units, and may reside within memory 130 of content management system 125 for execution by a processor, such as processor 127.

API gateway 135 may enable a client application, such as a desktop application, a mobile device application, scripts executed in a web browser, and the like, to access content management system 125. For example, client application 115 of user device 105 may access content management system 125 and its services via API gateway 135. When a request is received from a client application, API gateway 135 accesses a service registry to obtain the network address or other identifier for a service instance to which the request may be forwarded. Thus, when client application 115 transmits a search query to content management system 125, API gateway 135 may forward the request to search service 145. In some embodiments, the service registry includes an updated list of the instances of services and the health status of each instance, enabling API gateway 135 to forward a request to a healthy instance of a search service 145.

Authoring module 140 enables content authors to create, edit, and retrieve content items, and may include a user interface and/or authoring APIs. Authoring module 140 may import content to content management system 125. Content authors may access authoring module 140 via client application 115 in order to create new pages, author new content, and define new content types and page types. In some embodiments, authoring module 140 indicates any content changes, including the addition, removal, and/or modification of content, to search service 145 so that the changed content can be indexed accordingly.

Search service 145 may process search queries against a search index to retrieve relevant content. A search query may initially be provided by a user of user device 105, and may include one or more search terms or keywords. In addition, a search query may include Boolean operators. Search service 145 employs a two-step approach in which a received search query is first processed to select one or more search rules to be applied to the query. Rules that are selected in the first step are then applied to the search query to produce a modified query, which is then processed by search service 145 to identify relevant content.

Search rules may be manually defined by users or may be generated automatically. Each search rule may include a precondition and an action to rewrite a search query, which can be represented using an IF/THEN semantic. The precondition refers to one or more search terms that are included in a query, and the action contains instructions to modify a query if the precondition is satisfied. For example, a search query may have a precondition and action such that, when a search query includes the terms "laptop," "desktop," "tablet," a brand, "XYZ," is added to the query. Thus, when search service 145 receives a search query that includes the term "laptop," the search query may be rewritten as "XYZ laptop," which search service 145 then processes to return results that include content associated with laptops of brand XYZ. Thus, a search rule adapts a search query by modifying the query in some manner to alter the results that are returned, including the content that is returned and/or the order in which the content is presented.

In addition to using search terms as preconditions, search service 145 may implement search rules with preconditions that are satisfied according to contextual information that is associated with a search query. Contextual information can include an identifier of a user associated with the user device sending the search query, or an identifier of the device itself. Thus, search rules may be selectively applied to the search queries of specific users, devices, groups of users, and/or groups of devices. Additionally or alternatively, contextual information may include a view of an application's user interface, such as client application 115. For example, if a user provides a search query when the user is viewing a particular subsection of a website, such as an "electronics" section, one search rule may be applied to the query, whereas if the user provides a search query when the user is viewing an "apparel" section of the website, another search rule may be applied.

Search service 145 processes a search query using a search index, such as any of indexes 165. In general, a search index includes a representation of content that enables search service 145 to quickly identify content that is relevant to a search query. Content that is indexed by search service 145 may be stored locally in content management system 125. Additionally or alternatively, content that is indexed by search service 145 may be stored in one or more other computing systems accessible via network 175. Search service 145 may identify content that is relevant to a search query by scoring and ranking content items relative to the search query terms. Search service 145 may employ conventional or other ranking techniques, such as term frequency-inverse document frequency (tf-idf) approaches, in order to rank content.

In some embodiments, search rules are stored in a same index that indexes content. Search rules may be stored in a search index as dedicated content items of a special type. Thus, search service 145 may use a same search index to perform both phases of a search. In particular, when a search query is received, search service 145 performs a first search that returns search rules (e.g., content items of the special type), which are ranked according to the keywords of the search query and/or contextual information. Once one or more rules are applied to modify the search query, search service 145 performs a second search, using the same search index, that omits search rules and instead ranks content items like documents, web pages, media, etc.

Rule generation module 150 automatically creates search rules based on user interaction information collected by user monitoring module 120, which may be further processed by user feedback module 155 and/or machine learning module 160. In general, rule generation module 150 may identify query sequences, process the query sequences in addition to contextual information and user interaction information to identify content items, and generate rules based on the identified content items. A generated search rule includes a precondition that can be satisfied by keywords and/or contextual information of a search query, and an action that adapts a search query by modifying the search query in some manner. A search query can be modified by adding, modifying, or removing keywords, and/or by adding, modifying, or removing Boolean operators.

Rule generation module 150 identifies query sequences that can be analyzed to generate rules by analyzing queries provided by users in combination with the users' interactions with results of those queries. Each query sequence includes two or more search queries that are provided by a same user during a same client application session. A query sequence begins with a starter search query, ends with a target search query, and may optionally include one or more intervening search queries. Rule generation module 150 may identify a query sequence by chronologically ordering search queries received from a same user over a span of time.

The starter search query may be defined as a user's first search query of a query sequence. Rule generation module 150 may identify a target search query by analyzing a user's interactions with results of each search query of the query sequence. A user's dwell time on search results, selection of content, and navigation may be analyzed to identify a target search query. For example, if a user provides one or more search queries and scrolls through the results of each search query without selecting any of the results, and then selects one (or several) results of a subsequent search query, the subsequent search query may be identified as the target search query, as the subsequent search query returned results that were of interest to the user. As another example, when the results of a search query lead a user to make a purchase or other commitment, the search query may be considered a target search query. Rule generation module 150 may analyze user interaction information for one or multiple users in order to determine query sequences. Thus, rule generation module 150 may perform analysis on a user-specific or user group-specific basis, and search rules may be generated that apply globally to all users, to a specific user, and/or to a specific group of users.

Rule generation module 150 generates a search rule by processing an identified query sequence to determine a precondition and an action for the search rule. The precondition may be determined based on the identified starter search query. In some embodiments, the precondition is a conditional statement that is satisfied when a search query contains one or more keywords of the starter search query. A precondition may also be satisfied when a search query contains one or more keywords that are semantically similar to keywords of the starter search query. Additionally or alternatively, rule generation module 150 may select a precondition based on contextual information of the starter search query, including a view of client application 115 when the starter search query was provided and/or an identifier of the user or user device 105 providing the query.

Rule generation module 150 determines an action for a search rule based on the content items returned by a target search query and user interactions with the content items. The action is selected such that applying the action to a subsequent search query produces a modified search query that returns content items associated with the target search query. The content items of the target search query may be processed to extract one or more keywords, and rule generation module 150 may determine an action that adds the identified keywords to a search query.

In some embodiments, a subset of content items associated with the target search query are selected by machine learning module 160, which develops and utilizes a scoring model to determine scores for content items. Machine learning module 160 may score content items returned by a target search query by analyzing the content items together with user interaction information (e.g., user dwell time on search results, user selection of search results, and user navigation of search results, etc.) and/or contextual information (e.g., the user identifier, the view of client application 115, etc.). The scoring model provides a higher score to content items with which a user interacts, and keywords for an action are extracted from the content items having scores that exceed a threshold value. Thus, machine learning module 160 obtains a score for content items returned by a target search query that indicates how useful each content item is for a user or set of users of client application 115.

The scoring function may be machine-learned from training data that is produced by user feedback module 155 as a result of processing data obtained by user monitoring module 120. User feedback module 155 may create training data for the scoring function. The training data may include search query sequences and user interactions with the returned search results, application views, and user identifiers. User feedback module 155 computes a feedback metric having a value that corresponds to the degree with which a user interacts with each search result. A set of training data including the feedback metrics may then be utilized by machine learning module 160, which includes a learning function to train the scoring model using the set of training data. Thus, the scoring function may be trained to score content items based on user interactions with search results.

Machine learning module 160 may identify keywords for a search rule's action by employing a natural language processing function to extract the most relevant keywords from text associated with the identified content items. In particular, machine learning module 160 may utilize conventional or other natural language processing techniques to extract keywords. In some embodiments, machine learning module 160 trains a natural language processing model using domain-specific training data for one or more domains that are relevant to the content of content management system 125.

Indexes 165 may include one or more search indexes for search service 145. Each index 165 indexes content managed by content management system 125. In addition, indexes 165 may index search rules that can be applied to search queries. In some embodiments, content management system 125 provides management services for multiple tenants, organizations, or other groups of users, and maintains a separate index 165 for each entity. Thus, different content may be returned to users associated with different tenants, and search rules may be created and applied on a tenant-by-tenant basis.

Storage 170 may include any non-volatile storage media known in the art. For example, storage 170 can be implemented with a tape library, optical library, one or more independent hard disk drives, or multiple hard disk drives in a redundant array of independent disks (RAID). Similarly, data in storage 170 may conform to any suitable storage architecture known in the art, such as a file, a relational database, an object-oriented database, and/or one or more tables. In some embodiments, storage 170 may store data relating to search query processing and adaptation, including content, search query sequences, user interaction information, training data sets, and the like.

Network 175 may include a local area network (LAN), a wide area network (WAN) such as the Internet, or a combination of the two, and includes wired, wireless, or fiber optic connections. In general, network 175 can be any combination of connections and protocols known in the art that will support communications between user device 105 and content management system 125 via their respective network interfaces in accordance with embodiments of the present invention.

Figure 2:
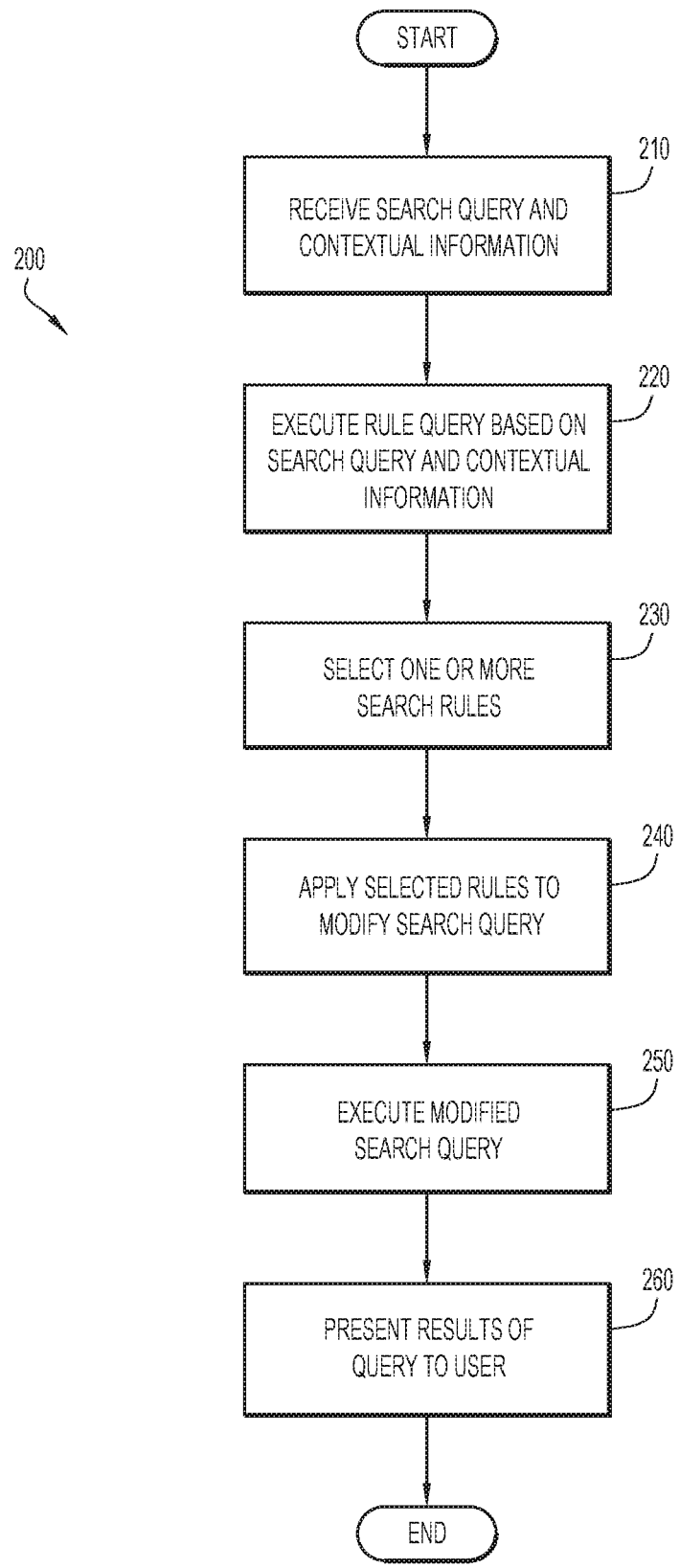
FIG. 2 is a flow chart depicting a method of query adaptation and execution in accordance with an embodiment of the present invention.

FIG. 2 is a flow chart depicting a method 200 of query adaptation and execution in accordance with an embodiment of the present invention.

A search query and contextual information relating to the query are received at operation 210. A search query may be received by search service 145 of content management system 125 from client application 115 of user device 105. The search query includes one or more keywords or terms, and may additionally include Boolean operators or other conditional logic. The contextual information may include the context of client application 115 when the search query was provided, including a view of the user interface of client application 115. A view may be defined according to an identifier, such as a uniform resource locator (URL) of a web page rendered in client application 115, a listing of content items presented in the view, a hash value generated based on the view, or any other description of the view. Contextual information may also include an identifier for the user associated with client application 115 and/or an identifier for user device 105.

A rule query is executed based on the search query and the contextual information at operation 220. Search service 145 may perform a rule query against a search index (e.g., any of indexes 165) in order to select search rules. In some embodiments, search rules are stored as content items of a special type in a same index that indexes content items, and search service 145 executes the rule query only against items labeled as search rule type. The rule query may include one or more keywords obtained from the search query, and may also contain the contextual information received with the search query. During execution of the rule query, search service 145 may identify one or more search rules at operation 230 whose preconditions are satisfied by any of the keywords and/or the contextual information.

The selected rules are applied to modify the original search query at operation 240. A rule's action may be applied to the search query in order to generate a modified query by, e.g., adding keywords, removing keywords, replacing keywords with other keywords, or performing other operations, such as adding or removing Boolean operators. In some embodiments, when multiple search rules are returned by the rule query, some or all of the search rules are applied to the search query.

The modified search query is executed at operation 250. Search service 145 may process the modified search query against an index in order to identify content items that are relevant to the keywords of the modified search query. Search service 145 identifies content that is relevant to the modified search query by scoring and ranking content according to conventional or other ranking techniques, such as a term frequency-inverse document frequency (tf-idf) ranking, in order to rank content.

The results of executing the modified search query are presented to a user at operation 260. Search results may be presented to a user of user device 105 in a user interface of client application 115. Content may be presented to a user in an order of relevancy as determined according to search service 145, or may be sorted according to user-specified features or details of the content.

Figure 3:
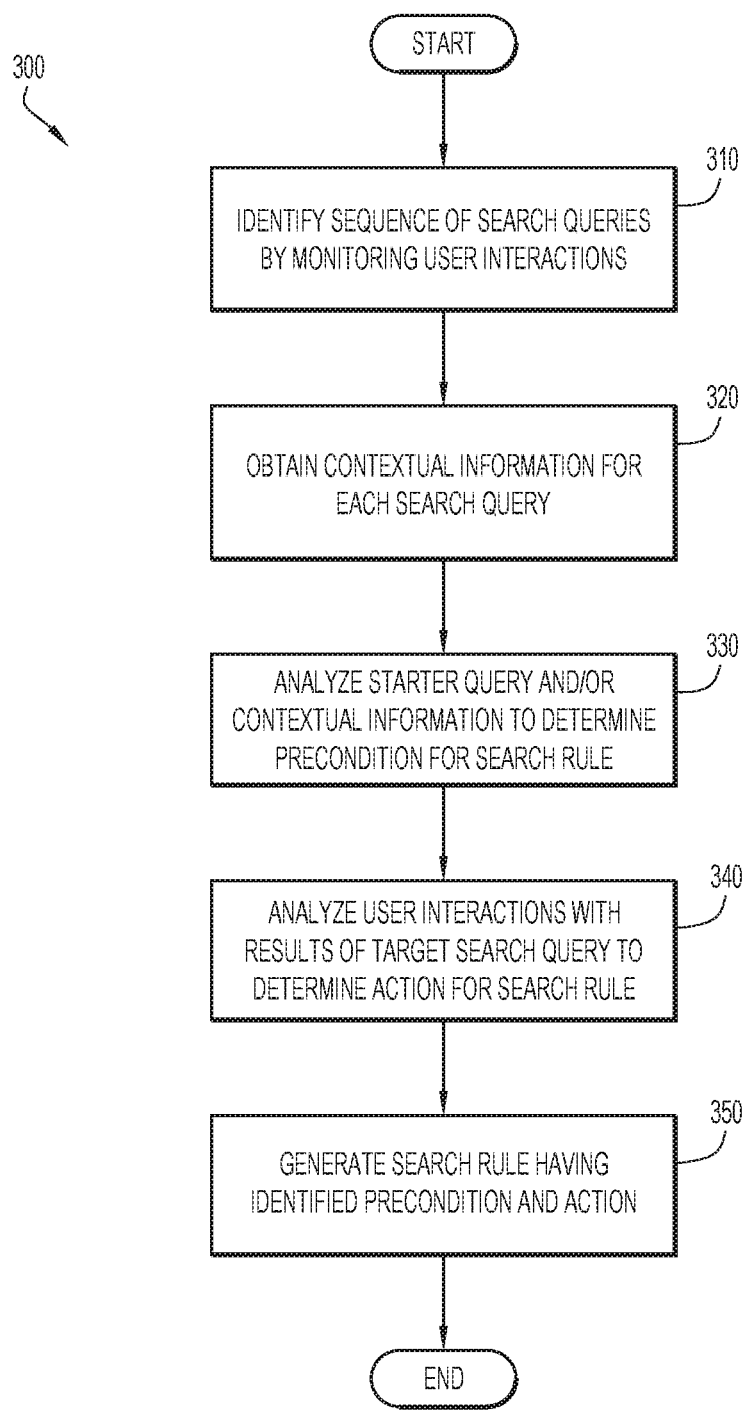
FIG. 3 is a flow chart depicting a method of generating search rules for query adaptation in accordance with an embodiment of the present invention.

FIG. 3 is a flow chart depicting a method 300 of generating search rules for query adaptation in accordance with an embodiment of the present invention.

A sequence of search queries is identified by monitoring user interactions at operation 310. A query sequence includes two or more search queries that are provided by a same user during a same client application session, and includes a starter search query and a target search query. The starter search query is identified as the first search query provided by a user during the client application session. Rule generation module 150 may identify a target search query by analyzing a user's interactions with results of each search query of the query sequence. In particular, the target search query may be identified by analyzing a user's dwell time on search results, selection of content, and navigation through search results.

Contextual information for each search query is obtained at operation 320. Contextual information may include the view of client application 115 when search queries of the query sequence are inputted, and/or an identifier for the user or user device 105 providing the search queries.

The starter search query and/or the contextual information of the starter search query is analyzed to determine a precondition for a search rule at operation 330. Rule generation module 150 may process the starter search query to extract keywords that can be included in the precondition. For example, if a starter search query includes "blue cotton backpack," rule generation module 150 may determine a precondition that can be satisfied if a subsequent query contains one or more of the keywords "blue," "cotton," and/or "backpack." In some embodiments, a precondition may be determined such that the precondition is satisfied when a subsequent query's contextual information matches the contextual information of the starter search query. For example, if a view of an application or a user identifier for an incoming search query matches the application view or user identifier of the starter search query, the precondition may be satisfied.

User interaction information associated with the results of the target search query are analyzed to determine an action for the search rule at operation 340. The content items returned by the target search query may be processed by machine learning model 160 to extract one or more keywords, and rule generation module 150 may determine an action that adds the identified keywords to a search query. In some embodiments, machine learning model 160 employs a scoring model to assign a score to content items returned by the target search query, and may extract one or more keywords from content items whose scores exceed a threshold value. The scoring function may be trained with user interaction information acquired from previous application sessions in which one or more users interacted with search results of queries. Thus, machine learning model 160 is trained to identify content items that are relevant based on users' behavior with respect to the content items. Identified content items may then be processed to extract keywords from the content items, and rule generation module 150 may generate an action that causes one or more of the extracted keywords to be added to a search query.

A search rule having the identified precondition and action is generated at operation 350. Rule generation module 150 may create a search rule with the precondition and action, and store the search rule in one or more indexes, such as indexes 165. Thus, when search service 145 receives a subsequent query that satisfies the precondition of the generated search rule, the action of the search rule can be applied to the query.

Figure 4:
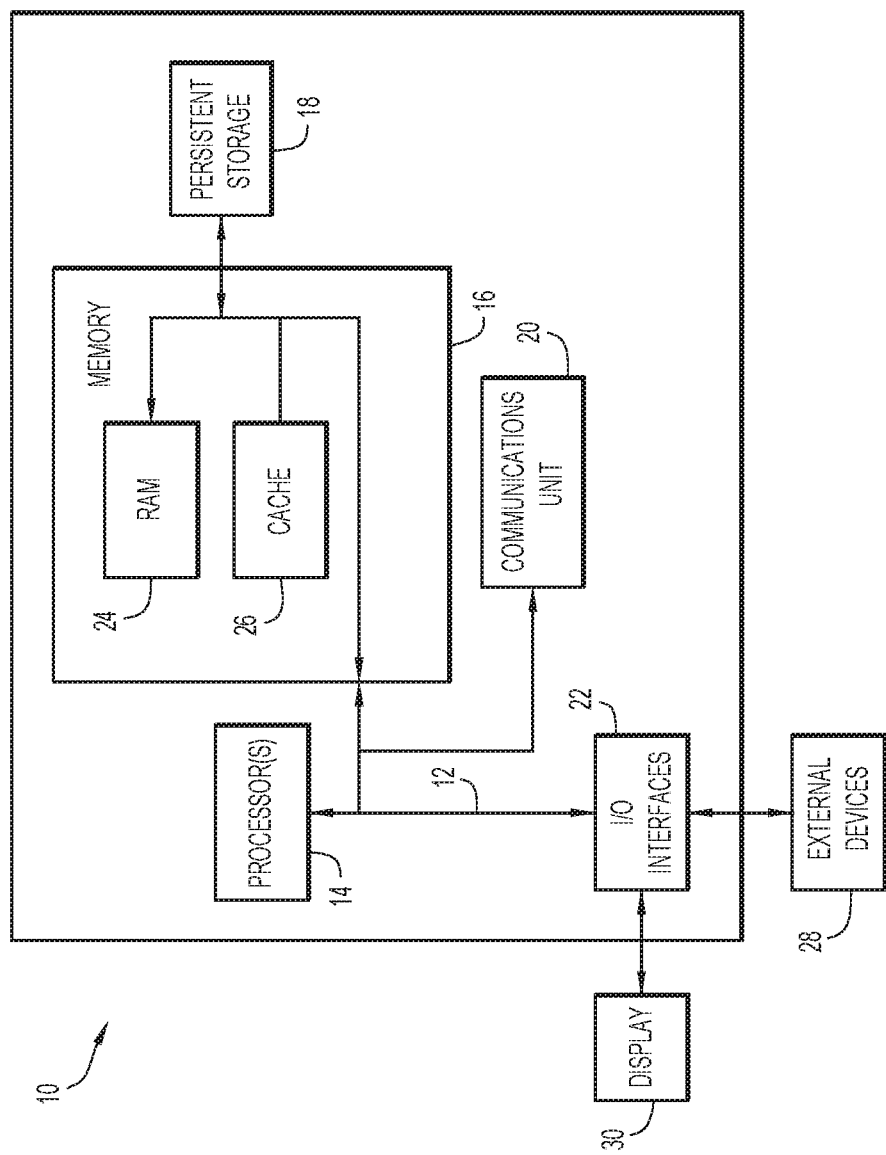
FIG. 4 is a block diagram depicting a computing device in accordance with an embodiment of the present invention.

FIG. 4 is a block diagram depicting components of a computer 10 suitable for executing the methods disclosed herein. Computer 10 may implement user device 105 and/or content management system 125 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to adapting queries for a search service in a content management system (e.g., search query data, data relating to content, search rules data, index data, user interaction information, machine learning model training data, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105 and/or content management system 125 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to adapting queries for a search service in a content management system (e.g., search query data, data relating to content, search rules data, index data, user interaction information, machine learning model training data, etc.) may include any information provided to, or generated by, user device 105 and/or content management system 125. Data relating to adapting queries for a search service in a content management system may include any desired format and arrangement, and may include any quantity of any types of fields of any size to store any desired data. The data relating to adapting queries for a search service in a content management system may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to adapting queries for a search service in a content management system), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of adapting queries for a search service in a content management system.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, client application 115, user monitoring module 120, API gateway 135, authoring module 140, search service 145, rule generation module 150, user feedback module 155, machine learning module 160, etc.). These systems may include any types of monitors and input devices (e.g., keyboard, mouse, voice recognition, etc.) to enter and/or view information.

It is to be understood that the software (e.g., browser software, communications software, server software, client application 115, user monitoring module 120, API gateway 135, authoring module 140, search service 145, rule generation module 150, user feedback module 155, machine learning module 160, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., browser software, communications software, server software, client application 115, user monitoring module 120, API gateway 135, authoring module 140, search service 145, rule generation module 150, user feedback module 155, machine learning module 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to adapting queries for a search service in a content management system). The database system may be implemented by any number of any conventional or other databases, data stores or storage structures (e.g., files, databases, data structures, data or other repositories, etc.) to store information (e.g., data relating to adapting queries for a search service in a content management system). The database system may be included within or coupled to the server and/or client systems. The database systems and/or storage structures may be remote from or local to the computer or other processing systems, and may store any desired data (e.g., data relating to adapting queries for a search service in a content management system).

The present invention embodiments may employ any number of any type of user interface (e.g., Graphical User Interface (GUI), command-line, prompt, etc.) for obtaining or providing information (e.g., data relating to adapting queries for a search service in a content management system), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, adapting search queries for any information that may be sought by a user and/or computing system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for searching content in a content management system by adapting queries, comprising:
    executing a rule query based on a search query to identify one or more search rules indicating modifications for the search query, wherein each search rule of the one or more search rules is generated by analyzing a starter search query and a target search query of one or more prior query sequences, and content items associated with the target search query of the one or more prior query sequences;
    modifying the search query by applying the one or more search rules to the search query; and
    executing the modified search query to select content items.

2. The computer-implemented method of claim 1, wherein the starter search query and the target search query of each prior query sequence are selected based on user interaction information collected during a client application session.

3. The computer-implemented method of claim 2, wherein the user interaction information includes one or more from a group of: user dwell time on search results, user selection of search results, and user navigation of search results.

4. The computer-implemented method of claim 1, wherein the one or more search rules each include a precondition for identifying the one or more search rules, wherein the precondition is determined based on one or more from a group of: the starter search query, the target search query, and contextual information, wherein the contextual information includes one or more from a group of: a user identifier, and a view of a client application.

5. The computer-implemented method of claim 1, wherein a search rule of the one or more search rules modifies the search query by adding one or more keywords to the search query, wherein the one or more keywords are determined by:
    scoring, using a machine learning model, the content items associated with the target search query; and
    selecting the one or more keywords based on scored content items that exceed a threshold score.

6. The computer-implemented method of claim 5, wherein the machine learning model is trained with a set of training data that is generated from user interactions with search results of the target search query of the one or more prior query sequences.

7. The computer-implemented method of claim 1, further comprising generating each search rule of the one or more search rules by analyzing contextual information of the starter search query and the target search query, the contextual information including one or more from a group of: a user identifier, and a view of a client application, and wherein the rule query is generated based on contextual information of the search query.

8. A computer system for adapting queries in a content management system, the computer system comprising:
    one or more computer processors;
    one or more computer readable storage media;
    program instructions stored on the one or more computer readable storage media for execution by at least one of the one or more computer processors, the program instructions comprising instructions to:
    execute a rule query based on a search query to identify one or more search rules indicating modifications for the search query, wherein each search rule of the one or more search rules is generated by analyzing a starter search query and a target search query of one or more prior query sequences, and content items associated with the target search query of the one or more prior query sequences;
    modify the search query by applying the one or more search rules to the search query; and
    execute the modified search query to select content items.

9. The computer system of claim 8, wherein the starter search query and the target search query of each prior query sequence are selected based on user interaction information collected during a client application session.

10. The computer system of claim 9, wherein the user interaction information includes one or more from a group of: user dwell time on search results, user selection of search results, and user navigation of search results.

11. The computer system of claim 8, wherein the one or more search rules each include a precondition for identifying the one or more search rules, wherein the precondition is determined based on one or more from a group of: the starter search query, the target search query, and contextual information, wherein the contextual information includes one or more from a group of: a user identifier, and a view of a client application.

12. The computer system of claim 8, wherein a search rule of the one or more search rules modifies the search query by adding one or more keywords to the search query, wherein the one or more keywords are determined by:
    scoring, using a machine learning model, the content items associated with the target search query; and
    selecting the one or more keywords based on scored content items that exceed a threshold score.

13. The computer system of claim 12, wherein the machine learning model is trained with a set of training data that is generated from user interactions with search results of the target search query of the one or more prior query sequences.

14. The computer system of claim 1, wherein the program instructions further comprise instructions to generate each search rule of the one or more search rules by analyzing contextual information of the starter search query and the target search query, the contextual information including one or more from a group of: a user identifier, and a view of a client application, and wherein the rule query is generated based on contextual information of the search query.

15. A computer program product for adapting queries in a content management system, the computer program product comprising a computer readable storage medium having program instructions embodied therewith, the program instructions executable by a computer to cause the computer to:
    execute a rule query based on a search query to identify one or more search rules indicating modifications for the search query, wherein each search rule of the one or more search rules is generated by analyzing a starter search query and a target search query of one or more prior query sequences, and content items associated with the target search query of the one or more prior query sequences;
modify the search query by applying the one or more search rules to the search query; and
execute the modified search query to select content items.

16. The computer program product of claim 15, wherein the starter search query and the target search query of each prior query sequence are selected based on user interaction information collected during a client application session.

17. The computer program product of claim 16, wherein the user interaction information includes one or more from a group of: user dwell time on search results, user selection of search results, and user navigation of search results.

18. The computer program product of claim 15, wherein the one or more search rules each include a precondition for identifying the one or more search rules, wherein the precondition is determined based on one or more from a group of: the starter search query, the target search query, and contextual information, wherein the contextual information includes one or more from a group of: a user identifier, and a view of a client application.

19. The computer program product of claim 15, wherein a search rule of the one or more search rules modifies the search query by adding one or more keywords to the search query, wherein the one or more keywords are determined by:
scoring, using a machine learning model, the content items associated with the target search query; and
selecting the one or more keywords based on scored content items that exceed a threshold score.

20. The computer program product of claim 19, wherein the machine learning model is trained with a set of training data that is generated from user interactions with search results of the target search query of the one or more prior query sequences.

* * * * *